United States Patent [19]

Olsson

[11] Patent Number: 5,564,079
[45] Date of Patent: Oct. 8, 1996

[54] METHOD FOR LOCATING MOBILE STATIONS IN A DIGITAL TELEPHONE NETWORK

[75] Inventor: Bo Olsson, Haninge, Sweden

[73] Assignee: Telia AB, Farsta, Sweden

[21] Appl. No.: 251,366

[22] Filed: May 31, 1994

[30] Foreign Application Priority Data

Jun. 21, 1993 [SE] Sweden ............................ 9302140

[51] Int. Cl.⁶ .............................. H04B 1/00; H04B 7/00
[52] U.S. Cl. ..................... 455/54.1; 455/54.2; 455/67.1
[58] Field of Search .................... 455/54.1, 67.1, 455/54.2, 56.1, 33.1; 342/357, 457; 364/449, 460, 461; 395/22

[56] References Cited

U.S. PATENT DOCUMENTS

| | | | |
|---|---|---|---|
| 4,990,922 | 2/1991 | Young et al. | 342/357 |
| 5,119,102 | 6/1992 | Barnard | 342/457 |
| 5,155,490 | 10/1992 | Spradley, Jr. et al. | 342/357 |
| 5,359,521 | 10/1994 | Kyrtsos et al. | 364/449 |

FOREIGN PATENT DOCUMENTS 470151  11/1993  Sweden.

Primary Examiner—Reinhard J. Eisenzopf
Assistant Examiner—Gertrude Arthur
Attorney, Agent, or Firm—Oblon, Spivak, McClelland, Maier & Neustadt, P.C.

[57] ABSTRACT

The invention relates to a method for locating mobile stations in a digital telecommunication network, especially the GSM network. According to the invention, reference measurements are carried out on relevant traffic routes with the aid of a measuring mobile in order to provide position information related to measured signals. With the aid of these reference data and the position information, an adaptive neural network is trained, which network, with the aid of corresponding measurement data which are transmitted from the mobile station to a respective base station, carries out the localization of the mobile station. Use of the adaptive neural network provides a more accurate position determination than earlier systems which were only based on the TA (timing advance) value.

3 Claims, 2 Drawing Sheets

5,564,079

METHOD FOR LOCATING MOBILE STATIONS IN A DIGITAL TELEPHONE NETWORK

FIELD OF THE INVENTION

The present invention relates to a method for locating mobile stations in a digital telephone network, especially the GSM network. The invention utilizes a combination of reference measurements using a measuring mobile and anadaptive neural network which is trained by means of the reference data. The neural network then uses existing measurement data from mobile stations in order to locate the latter.

BACKGROUND OF THE INVENTION

Various systems for locating are already known.

EP 0 512 789 shows a locating system of high accuracy which utilizes the global positioning system (GPS) for determining position, speed and time information for, for example, a vehicle in a mobile radio system. To increase the accuracy in position determination, reference measurements can be made at known locations. These reference measurements are utilized for increasing the locating accuracy in the areas around these locations. The system also has the possibility of storing a digital map of the area in question and utilizing this for facilitating the position calculations.

EP 0 335 558 describes a radio communications system with fixed and mobile stations. The mobile stations can be located by measuring the transit time for signals between the mobile stations and at least two fixed stations. The accuracy of the system can be improved by storing data which represent a route map of the area in question in the base stations. The calculated position can then be adjusted in accordance with the map by assuming that the mobile station is located on a road.

U.S. Pat. No. 5,166,694 describes a system for locating vehicles. The system is provided with good accuracy by utilizing all the information which is available in the fixed receivers. The system then selects an optimum array of information which provides the smallest error and uses this array for calculating the position. The calculation time can be shortened by only using part of the available information.

U.S. Pat. No. 5,043,736 relates to a cellular telephone system with the possibility of obtaining the current position of a person in the system. The mobile station, which is located with the aid of satellites, transmits information about its position to the cellular telephone system. The position of the mobile station can be centrally monitored with the aid of this information.

EP 0 431 956 shows a way of monitoring a mobile telephone system. The system has the possibility of receiving, via the base stations, data such as position, signal quality and signal strength for a mobile during an ongoing call. This information can then be presented visually in such a manner that it is easy to follow where the traffic is being generated and what coverage there is in the system.

The present invention permits a further improvement of the accuracy in locating by using an adaptive neural network which is trained with reference data and measurement data from mobile stations. The accuracy is high, especially in comparison with earlier systems which only utilize the timing advance (TA) information which can give considerable errors due to time dispersion.

SUMMARY OF THE INVENTION

The present invention thus provides a method for locating a mobile station in a digital telecommunication network. According to the invention, reference measurements are carried out on relevant traffic routes in order to provide position information related to measured signals. An adaptive neural network is trained with the aid of measured reference data and position information. Corresponding measurement data are transmitted from the mobile station to a respective base station. The trained adaptive neural network is coupled to the base station and carries out the localisation of the mobile station with the aid of measurement data from the mobile station.

The invention is defined in greater detail in the subsequent patent claims.

DETAILED DESCRIPTION OF PREFERRED EMBODIMENTS

Figure 1:
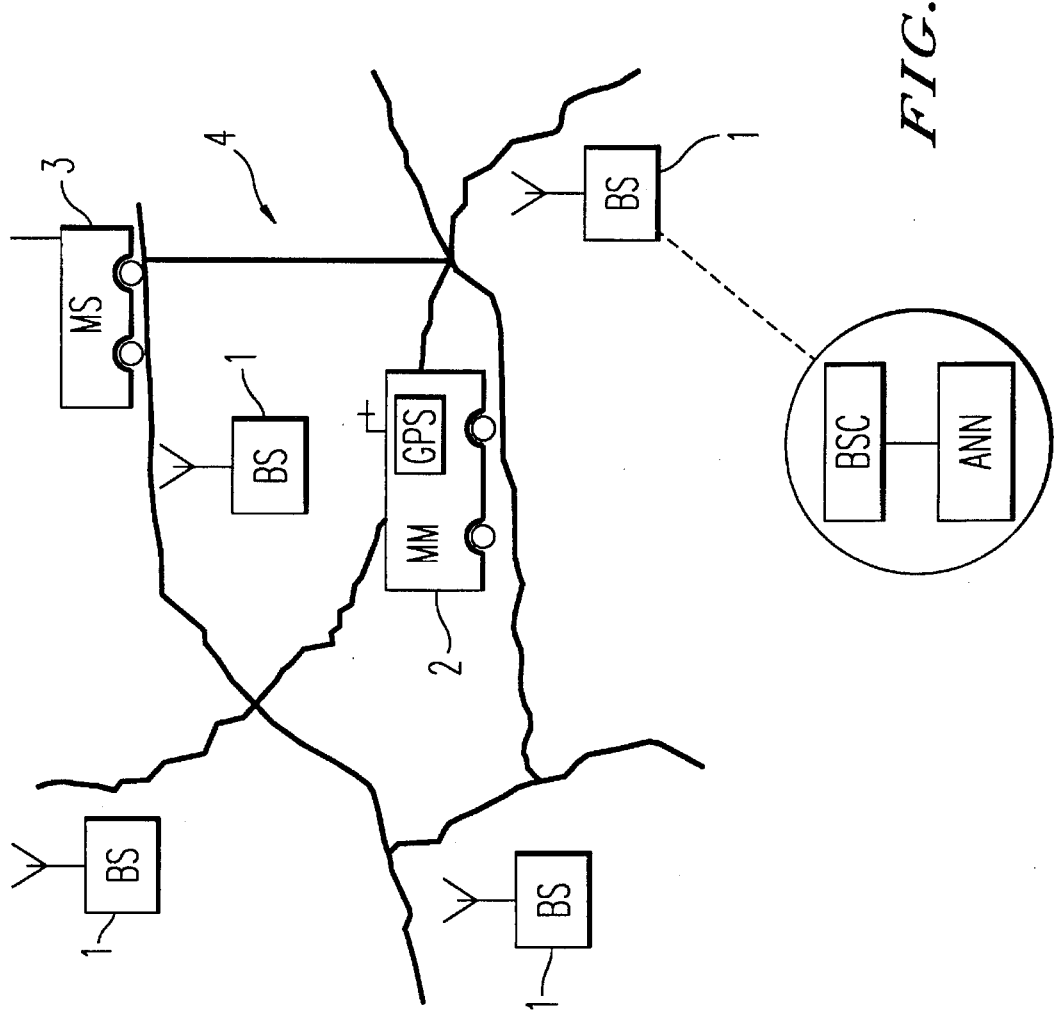
FIG. 1 is a schematic diagram of the digital telecommunications network of this invention including traffic routes and radio units.
Figure 2:
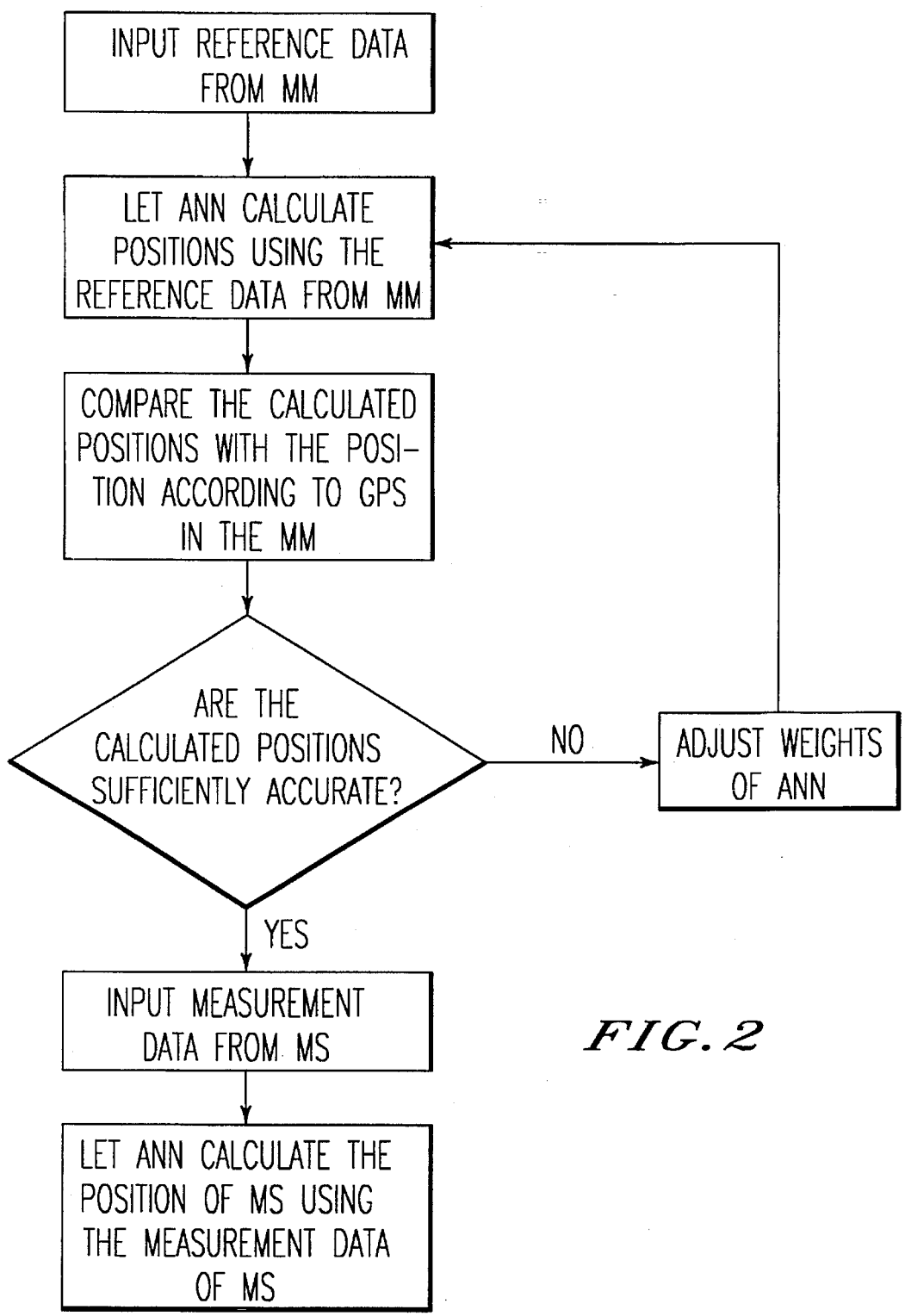
FIG. 2 is a flow chart of a location method according to this invention.

In the Figures provided, Base stations, are identified with the legend BS 1 with the Base Station Controller being labeled as BSC. A measuring mobile is labeled MM 2 using a Global Positioning System GPS is shown. The mobile stations are labeled MS 3, wherein measurements are taken along route 4.

The localisation of the mobile stations is of interest to an operator of a digital telecommunication network from three aspects:

1. It is possible to measure where the mobile telephone traffic is being generated, that is to say where the mobile stations are located when they are loading the system with traffic. This provides information on how the system is to be dimensioned.

2. It is possible to locate where a normal mobile station is located by calling it. This can be an additional service.

3. It is possible to estimate road or street traffic for the larger traffic routes by making reference models for these. It is consequently possible to estimate how many calls are occurring on the stretch of road and what the mean speed of the mobile stations, that is to say the cars, is.

The invention utilizes information which is regularly measured in existing systems without needing to add internal functions. The information is used by further processing with the aid of the invention.

The invention utilizes reference measurement of the telecommunication network. A measuring mobile carries out measurements over all relevant traffic routes. An adaptive neural network is trained with the aid of the collected reference data in order to obtain a correlation between the measured reference data and position information. In existing telecommunication systems, the mobile stations continuously transmit measurement data to the base stations. Using these measurement data, the adaptive neural network can carry out accurate localisation due to the training with reference data.

The reference data for the most interesting traffic thoroughfares are collected by field measurements with the aid of a measuring mobile equipped with a GPS receiver and set of instruments (dead reckoning) for positioning. The equipment is available today and has an inaccuracy of approximately 60 m. Reference measurements should be done on all larger traffic thoroughfares. The stored reference data consists, apart from the position information, for example the national network, of collected measurement data from the measuring mobile. The data include:

received signal strength from the communicating base station with identity, cell identity CGI (cell global identity) timing advance (TA) which provides an approximate distance signal strength from neighboring base stations with respective frequency and colour code, base station colour code, BCC. In GSM, signal strengths are reported which have been measured by the mobile stations from up to six neighboring base stations. BCC and frequency (ARFCN) are converted prior to storage and use to a cell identity (CGI) so that these reference data can be used even after a frequency shift in the system. There must consequently exist a cross reference list between frequency and identity which is updated with each frequency shift;

handover to a new base station with time and position is implicit in the log and can also be used.

In the GSM system, the mobile station, with an established call, transmits measurement data which correspond to the reference data of the system once per 480 ms period. This is used by the base station controller (BSC) in order to regulate the power of the mobile station and order handover between base stations. These so-called measurement reports can today be read at the interface between the base station and the controller. The possibility is foreseen of reading this information directly in the controller in the near future.

A separate computer is connected to the base station controller BSC and is equipped with software for an adaptive neural network. In order to be able to use the neural network, it must be trained on reference data, that is to say all the reference data are fed into the network without position information and the output result, position, is compared with the position which is obtained with the GPS equipment. If the output result deviates from the reference position, the weightings in the adaptive neural network are adjusted in accordance with an algorithm. After a sufficiently long learning sequence, the adaptive neural network can, if it has sufficiently many states, solve complex patterns, for example the signal strength and TA pattern for the localisation of a mobile station, that is to say locate a mobile station. Localisation of the mobile station can consequently be carried out by processing the abovementioned measurement report. By following mobile stations during a call, the mean speed of the important traffic thoroughfares can also be estimated, in addition to the position.

The present invention thus offers the advantage that all available information is compared with the reference data instead of only depending on TA (timing advance), which can give rise to considerable errors due to time dispersion. Furthermore, no changes in the existing system are needed, but only access to the measurment data. The accuracy is high, at least for the streets and roads which are used for the reference measurements. The scope of the invention is only limited by the patent claims below.

I claim:

1. Method for locating a mobile station in a digital telecommunication network, comprising the step of:

measuring no-location reference data indicative of signal strength and timing advance signals from plural base stations, wherein the measuring is performed at a reference mobile station on relevant traffic routes at known positions of the mobile station, training an adaptive neural network using the measured non-location reference data as inputs and the known positions of the reference mobile station as desired outputs, measuring at a subscriber mobile station non-location data indicative of signal strength and timing advance signals from said plural base stations, wherein the measured non-location data are transmitted from the subscriber mobile station to at least one of said plural base stations, and determining a location of the subscriber mobile station using the trained adaptive neural network, wherein the trained neural network is coupled to the plural base stations and determines the location of the subscriber mobile station using the measured non-location data from the subscriber mobile station.

2. Method according to claim 1, wherein the step of measuring non-location reference data comprises:

using the reference mobile station equipped with GPS receiver to measure the non-location reference data.

3. Method according to claim 1 or 2, wherein the step of training the adaptive neural network comprises:

training the adaptive neural network by inputting the measured non-location reference data, calculating a position from the measured non-location reference data, comparing the calculated position with a respective one of the known positions of the reference mobile station, and adjusting the adoptive neural network based on the comparison.

* * * * *